(12) United States Patent
Tada

(10) Patent No.: US 8,390,596 B2
(45) Date of Patent: Mar. 5, 2013

(54) CONTROL CIRCUIT AND CONTROL METHOD FOR TOUCH PANEL

(75) Inventor: Naoki Tada, Kyoto (JP)

(73) Assignee: Rohm Co., Ltd. (JP)

( * ) Notice: Subject to any disclaimer, the term of this patent is extended or adjusted under 35 U.S.C. 154(b) by 155 days.

(21) Appl. No.: 13/076,545

(22) Filed: Mar. 31, 2011

(65) Prior Publication Data

US 2011/0279404 A1    Nov. 17, 2011

(30) Foreign Application Priority Data

Apr. 1, 2010    (JP) .................................. 2010-085092

(51) Int. Cl.
*G06F 3/045* (2006.01)
(52) U.S. Cl. ........................................ 345/174; 174/173
(58) Field of Classification Search ............... 345/173, 345/174
See application file for complete search history.

(56) References Cited

U.S. PATENT DOCUMENTS 8,274,485 B2 *    9/2012    Liu et al. ........................ 345/173

FOREIGN PATENT DOCUMENTS

JP    2009-48233 A    3/2009

* cited by examiner

*Primary Examiner* — Kevin M Nguyen
*Assistant Examiner* — Sepideh Ghafari
(74) *Attorney, Agent, or Firm* — Cantor Colburn LLP

(57) ABSTRACT

A coordinate generating unit provisionally determines the X-coordinate of a point touched by the user based upon a first panel current and at least one of first and second panel voltages in a first state, and provisionally determines the Y-coordinate of the point touched by the user based upon at least a third panel voltage and a second panel current. When the user touches the two points, i.e., the first and second points, at the same time, the coordinate generating unit determines the coordinates of the first and second points by combining the two provisionally determined X-coordinates and the two provisionally determined Y-coordinates, based upon the magnitude relation between the first and second panel voltages.

14 Claims, 9 Drawing Sheets

CONTROL CIRCUIT AND CONTROL METHOD FOR TOUCH PANEL

BACKGROUND OF THE INVENTION

1. Field of the Invention

The present invention relates to a resistive film touch panel, and particularly to a technique for detecting a simultaneous touch state (multi-touch state) in which the user touches multiple points.

2. Description of the Related Art

In recent years, it has become mainstream for electronic devices such as computers, cellular phone terminals, PDAs (Personal Digital Assistants), etc., to include an input apparatus which allows the user to operate the electronic device by using the fingers to touch the input device. Known examples of such input devices include resistive film touch panels (touch sensors) (Patent document 1).

In recent years, there is a demand for a touch panel which supports multi-touch operations. However, such touch panels have been realized only as electrostatic sensor touch panels, and have not been realized as resistive film touch panels. This is because, with such a resistive film touch panel, a position (coordinate) touched by the user is determined based upon the voltage output from the panel. However, such an arrangement is not capable of distinguishing between the output voltage of the panel in a case in which the user touches two positions (multi-touch operation) and the output voltage thereof in a case in which the user touches a single position (single touch operation).

Patent document 1 discloses a touch panel input apparatus which allows the user to perform multi-touch operations. However, this touch panel input apparatus handles such multi-touch operations as an input error. That is to say, such an arrangement does not actively support multi-touch operations as valid input operations. Thus, no technique has been disclosed which identifies the multiple coordinates involved in such a multi-touch operation.

The present applicant has created a technique for detecting the coordinates of multiple points touched at the same time on a resistive film touch panel (Japanese Patent Application No. 2009-48233). With such a technique, the current that flows through the panel is measured, and by considering the measurement result, the coordinates of such multiple points can be estimated.

RELATED ART DOCUMENTS

Patent Documents

[Patent Document 1]
Japanese Patent Application Laid Open No. 2009-48233

The present applicant has come to recognize that, in some cases, when detecting the coordinates of multiple points touched at the same time, such a resistive film touch panel has a problem of misdetection of coordinates (which are also referred to as "ghost points") that were not originally touched by the user.

SUMMARY OF THE INVENTION

The present invention has been made in order to solve such a problem. Accordingly, it is an exemplary purpose of an embodiment of the present invention to provide a technique which allows the coordinates of multiple points touched at the same time to be detected with high precision.

An embodiment of the present invention relates to a control method for a touch panel. The touch panel to be controlled comprises a first terminal, a second terminal, a third terminal, a fourth terminal, a first resistive film arranged such that one edge thereof that extends in a first direction is connected to the first terminal and an edge that is opposite to the aforementioned one edge is connected to the second terminal, and a second resistive film arranged with a gap between it and the first resistive film such that one edge thereof that extends in a second direction orthogonal to the aforementioned first direction is connected to the third terminal, and an edge that is opposite to the aforementioned one edge is connected to the fourth terminal. The control method comprises the following steps. It should be noted that, to such an extent that the processing is not adversely affected, the sequence of the steps can be rearranged, or several steps can be simultaneously executed in a parallel manner.

a. Applying a predetermined first bias voltage and a predetermined second bias voltage to the first terminal and the second terminal, respectively.
b. Detecting a first panel voltage and a second panel voltage that occur at the third and fourth terminals, respectively.
c. Detecting a first panel current that flows through a path that comprises the first terminal, the first resistive film, and the second terminal.
d. Provisional determination of the second-direction coordinate of a point touched by the user based upon the first panel current and at least one of the first and second panel voltages.
e. Applying predetermined third and fourth bias voltages to the third and fourth terminals, respectively.
f. Detecting a third panel voltage that occurs at one of the first and second terminals.
g. Detecting a second panel current that flows through a path that comprises the third terminal, the second resistive film, and the fourth terminal.
h. Provisional determination of the first-direction coordinate of the point touched by the user, based upon at least the third panel voltage and the second panel current.
i. Determining the coordinates of two points by combining the second-direction coordinates of the two points thus provisionally determined and the first-direction coordinates of the two points thus provisionally determined, based upon the magnitude relation between the first panel voltage and the second panel voltage, when the user touches the two points at the same time.

With such an embodiment, by using the first panel voltage and the second panel voltage, such an arrangement is capable of precisely determining the coordinates of the two points. Thus, such an arrangement solves a problem of ghost points.

Also, when the two points are to be differentiated as a first point and a second point, in the aforementioned step (i) for determining the coordinates of the two points, from among the aforementioned points determined in the current stage, one point that is closer to the previous first point may be selected as the current first point, and the farther point may be selected as the current second point.

With such an embodiment, when the first point and the second point move, the movement can be tracked with high precision.

Also, the step (i) for determining the coordinates of the two points may comprise the following steps.

i1. Calculating first difference data that corresponds to the difference between the first-direction coordinate of the first point determined in the previous stage and the first-direction coordinate of one of the two points detected in the current stage.

i2. Calculating second difference data that corresponds to the difference between the first-direction coordinate of the first point determined in the previous stage and the first-direction coordinate of the other of the two points detected in the current stage.

i3. Respectively assigning the aforementioned two points to the first point and the second point based upon the magnitude relation between the first difference data and the second difference data.

Also, the step for determining the coordinates of the two points may comprise the following steps.

i4. Calculating third difference data that corresponds to the difference between the second-direction coordinate of the first point determined in the previous stage and the second-direction coordinate of one of the two points detected in the current stage.

i5. Calculating fourth difference data that corresponds to the difference between the second-direction coordinate of the first point determined in the previous stage and the second-direction coordinate of the other of the two points detected in the current stage.

i6. Respectively assigning the aforementioned two points to the first point and the second point based upon the magnitude relation between the third difference data and the fourth difference data.

Also, the step for determining the coordinates of the two points may comprise the following steps.

i1. Calculating first difference data that corresponds to the difference between the first-direction coordinate of the first point determined in the previous stage and the first-direction coordinate of one of the two points detected in the current stage.

i2. Calculating second difference data that corresponds to the difference between the first-direction coordinate of the first point determined in the previous stage and the first-direction coordinate of the other of the two points detected in the current stage.

i4. Calculating third difference data that corresponds to the difference between the second-direction coordinate of the first point determined in the previous stage and the second-direction coordinate of one of the two points detected in the current stage.

i5. Calculating fourth difference data that corresponds to the difference between the second-direction coordinate of the first point determined in the previous stage and the second-direction coordinate of the other of the two points detected in the current stage.

i7. Calculating fifth difference data that corresponds to the difference between the first difference data and the second difference data.

i8. Calculating sixth difference data that corresponds to the difference between the third difference data and the fourth difference data.

i9. Performing an assignment operation such that, when the fifth difference data is greater than the sixth difference data, the aforementioned two points are assigned to the first point and the second point based upon the magnitude relation between the first and second difference data, and when the sixth difference data is greater than the fifth difference data, the aforementioned two points are assigned to the first point and the second point based upon the magnitude relation between the third and fourth difference data.

With such an arrangement, the greater of the fifth difference data and the sixth difference data is selected, thereby providing the assignment operation with improved precision.

Also, the step (d) for provisionally determining the second-direction coordinate may comprise a step d1 in which judgment is made that the user has touched multiple points when the first panel current is greater than a predetermined value. Also, the step (h) for provisionally determining the first-direction coordinate may comprise a step h1 in which judgment is made that the user has touched multiple points when the second panel current is greater than a predetermined value.

When the user touches the multiple points on the touch panel, the combined resistance of a path from the first terminal up to the second terminal (or from the third terminal up to the fourth terminal) is reduced. Thus, the panel current changes according to the change in the combined resistance. With such an embodiment, by monitoring the panel current, such an arrangement is capable of appropriately detecting the multi-touch state.

Also, the step (d) for provisionally determining the second-direction coordinate may comprise the following steps.

d2. Determining the interval between the second-direction coordinates of the aforementioned two points based upon the first panel current.

d3. Determining the second-direction coordinate of the midpoint between the aforementioned two points based upon at least one of the first and second panel voltages.

d4. Determining the second-direction coordinate of one of the aforementioned two points by summing the coordinate of the midpoint and a value that corresponds to the interval between the coordinates of the two points, and determining the second-direction coordinate of the other of the two points by subtracting a value that corresponds to the interval between the coordinates of the two points from the coordinate of the midpoint.

Also, the step (h) for provisionally determining the first-direction coordinate may comprise the following steps.

h2. Determining the interval between the first-direction coordinates of the aforementioned two points based upon the second panel current;

h3. Determining the first-direction coordinate of the midpoint between the aforementioned two points based upon at least the third panel voltage.

h4. Determining the first-direction coordinate of one of the aforementioned two points by summing the coordinate of the midpoint and a value that corresponds to the interval between the coordinates of the two points, and determining the first-direction coordinate of the other of the two points by subtracting a value that corresponds to the interval between the coordinates of the two points from the coordinate of the midpoint.

When the user touches the two points, the path between the two points is configured as the first resistive film and the second resistive film connected in parallel. Accordingly, the combined resistance of a path from the first terminal up to the second terminal (or from the third terminal up to the fourth terminal) is reduced, thereby increasing the panel current. As the distance between the two points is greater, the distance of the path thus configured as the first resistive film and the second resistive film connected in parallel becomes greater. This reduces the combined resistance, thereby increasing the panel current. Thus, such an arrangement is capable of determining the interval between the coordinates of the two points based upon the panel current.

Another embodiment of the present invention relates to a control circuit configured to control a touch panel. The control circuit comprises: a voltage generating unit configured to respectively apply a predetermined first bias voltage and a predetermined second bias voltage to the first terminal and the second terminal in a first state, and to respectively apply a predetermined third bias voltage and a predetermined fourth bias voltage to the third terminal and the fourth terminal in a second state; a voltage detection unit configured to detect a first panel voltage and a second panel voltage that respectively occur at the third and fourth terminals in the first state, and to detect a third panel voltage that occurs at one of the third and fourth terminals in the second state; a current detection unit configured to detect a first panel current that flows through a path that comprises the first terminal, the first resistive film, and the second terminal in the first state, and to detect a second panel current that flows through a path that comprises the third terminal, the second resistive film, and the fourth terminal in the second state; and a coordinate generating unit configured to provisionally determine the second-direction coordinate of a point touched by the user based upon the first panel current and at least one of the first and second panel voltages in the first state, to provisionally determine the first-direction coordinate of the point touched by the user based upon at least the third panel voltage and the second panel current in the second state, and to determine the coordinates of two points by combining the second-direction coordinates of the two points thus provisionally determined and the first-direction coordinates of the two points thus provisionally determined, based upon the magnitude relation between the first panel voltage and the second panel voltage, when the user touches the two points, i.e., a first point and a second point at the same time.

Yet another embodiment of the present invention relates to a touch panel input apparatus. The touch panel input apparatus comprises: a touch panel that comprises a first terminal, a second terminal, a third terminal, a fourth terminal, a first resistive film arranged such that one edge thereof that extends in a first direction is connected to the first terminal and an edge that is opposite to the aforementioned one edge is connected to the second terminal, and a second resistive film arranged with a gap between it and the first resistive film such that one edge thereof that extends in a second direction orthogonal to the aforementioned first direction is connected to the third terminal, and an edge that is opposite to the aforementioned one edge is connected to the fourth terminal; and the aforementioned control circuit configured to control the touch panel.

Yet another embodiment of the present invention relates to an electronic device. The electronic device comprises the aforementioned touch panel input apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
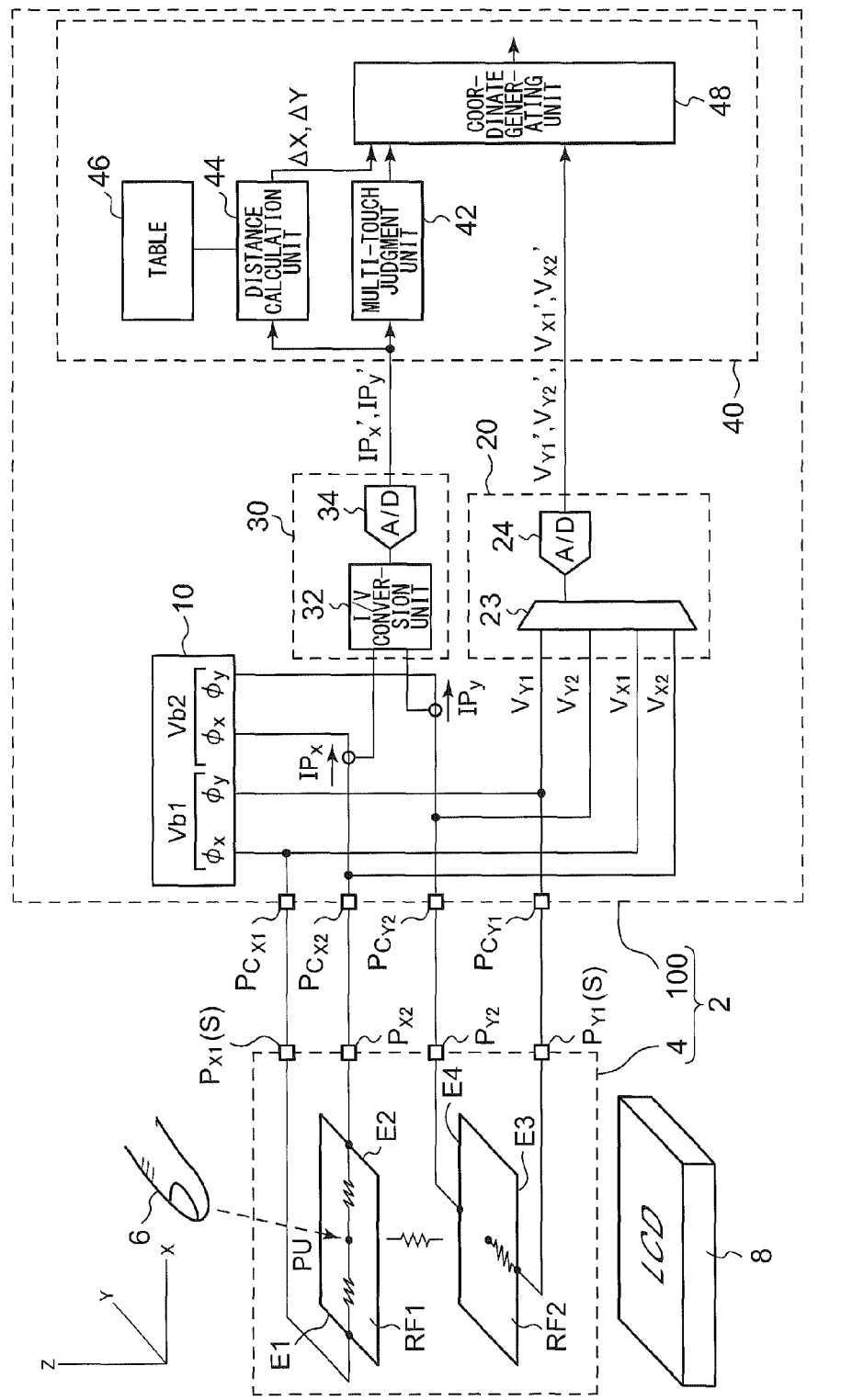
FIG. 1 is a block diagram which shows a configuration of an electronic device including a touch panel input apparatus according to an embodiment.

FIG. 1 is a block diagram which shows a configuration of an electronic device 1 including a touch panel input apparatus (which will simply be referred to as the "input apparatus") 2 according to an embodiment. The input apparatus 2 is arranged on a surface layer of an LCD (Liquid Crystal Display) 8, and functions as a touch panel. The input apparatus 2 identifies the X-coordinates and the Y-coordinates of points (positions) touched by the user via a finger, a pen, or the like (which will collectively be referred to as the "finger 6" hereafter).

The input apparatus 2 includes a touch panel 4 and a control circuit 100. The touch panel 4 is configured as a four-line (four-terminal) resistive film touch panel. The touch panel 4 has a typical configuration, and accordingly, a brief description thereof will be made below.

The touch panel 4 includes a first terminal $P_{x1}$, a second terminal $P_{x2}$, a third terminal $P_{Y1}$, a fourth terminal $P_{Y2}$, a first resistive film RF1, and a second resistive film RF2.

The first resistive film RF1 and the second resistive film RF2 are arranged such that one is overlaid on the other with a gap between them in the Z-axis direction, which is orthogonal to the X-axis and the Y-axis. An edge E1, which extends along a first direction (Y-axis direction) of the first resistive film RF1, is connected to the first terminal $P_{x1}$. An edge E2, which is opposite to the edge E1, is connected to the second terminal $P_{X2}$. The third terminal $P_{Y1}$ is connected to an edge E3, which extends along a second direction (X-axis direction) that is orthogonal to the first direction of the second resistive film RF2. The fourth terminal $P_{Y2}$ is connected to an edge E4, which is opposite to the edge E3 of the second resistive film RF2.

The above is the structure of the touch panel 4.

The control circuit 100 detects a position touched by the user while switching states in a time sharing manner between a first state φx in which the X direction coordinate is detected and a second state φy in which the Y direction coordinate is detected.

The control circuit 100 includes a first terminal $Pc_{X1}$ through a fourth terminal $Pc_{Y2}$, a voltage generating unit 10, a voltage detection unit 20, a current detection unit 30, and a computation unit 40.

The first terminal $Pc_{X1}$ through the fourth terminal $Pc_{Y2}$ are connected to the corresponding terminals on the touch panel 4 side, i.e., are respectively connected to the first terminal $P_{x1}$ through the fourth terminal $P_{Y2}$.

First, description will be made regarding the configuration for detecting the X direction coordinate (X-coordinate).

In the first state φx, the voltage generating unit 10 applies a predetermined first bias voltage Vb1 and a predetermined second bias voltage Vb2 to the first terminal $P_{x1}$ and the second terminal $P_{x2}$, respectively. Here, the relation Vb1>Vb2 is taken to be satisfied. The second bias voltage Vb2 is preferably set to the ground voltage (0 V). Furthermore, in the first state φx, the voltage generating unit 10 sets each of the third terminal $P_{Y1}$ and the fourth terminal $P_{Y2}$ to the high-impedance state.

In the first state φx, the voltage detection unit 20 detects a first panel voltage $V_{Y1}$ that occurs at the third terminal $P_{Y1}$ and a second panel voltage $V_{Y2}$ that occurs at the fourth terminal $P_{Y2}$. The voltage detection unit 20 includes an A/D converter 24, and converts the first panel voltage $V_{Y1}$ and the second panel voltage $V_{Y2}$ thus detected into digital signals $V_{Y1}'$ and $V_{Y2}'$, respectively.

In the first state φx, the current detection unit 30 detects a first panel current IPx that flows through a path including the first terminal $P_{x1}$, the first resistive film RF1, and the second terminal $P_{x2}$. The current detection unit 30 includes an I/V conversion unit 32 configured to convert the first panel current IPx into a voltage signal, and an A/D converter 34 configured to convert the voltage signal into a digital signal VPx'.

The computation unit (coordinate generating unit) 40 determines the X-coordinate of the point PU touched by the user, based upon the panel current IPx' and at least one of the panel voltages $V_{Y1}'$ and $V_{Y2}'$.

Next, description will be made regarding a configuration for detecting the Y direction coordinate (Y-coordinate).

In the second state φy, the voltage generating unit 10 applies a predetermined third bias voltage Vb3 and a predetermined fourth bias voltage Vb4, which are respectively applied to the third terminal $P_{Y1}$ and the fourth terminal $P_{Y2}$. Furthermore, in the second state φy, the voltage generating unit 10 sets each of the first terminal $P_{x1}$ and the second terminal $P_{x2}$ to the high-impedance state. The first bias voltage Vb1 used in the first state φx may be the same as the third bias voltage Vb3 used in the second state φy, or they may be different. Description will be made below regarding an arrangement in which the first voltage Vb1 used in the first state is the same as the third bias voltage Vb3 used in the second state φy. The same can be said of the relation between the second bias voltage Vb2 and the fourth bias voltage Vb4.

In the second state φy, the voltage detection unit 20 detects a third panel voltage $V_{X1}$ and a fourth panel voltage $V_{X2}$ that respectively occur at the first terminal $P_{x1}$ and the second terminal $P_{X2}$. The A/D converter 24 converts the panel voltages $V_{X1}$ and $V_{X2}$ thus detected into digital signals $V_{X1}'$ and $V_{X2}'$.

The voltage detection unit 20 includes a four-input selector 23. The four-input selector 23 receives the panel voltages $V_{X1}$, $V_{X2}$, $V_{Y1}$, and $V_{Y2}$, as input signals. In the first state φx, the selector 23 sequentially selects the panel voltage $V_{Y1}$ and $V_{Y2}$. In the second state φx, the selector 23 sequentially selects the panel voltage $V_{X1}$ and $V_{X2}$.

In the second state φy, the current detection unit 30 detects a second panel current IPy that flows through a path including the third terminal $P_{Y1}$, the second resistive film RF2, and the fourth terminal $P_{Y2}$. The I/V conversion unit 32 converts the second panel current IPy into a voltage signal. The A/D converter 34 converts the voltage signal thus converted into a digital value IPy'.

The computation unit (coordinate generating unit) 40 determines the Y-coordinate of the point PU touched by the user, based upon the panel current IPy' and at least one of the panel voltages $V_{X1}'$ and $V_{X2}'$.

The above is the overall configuration of the control circuit 100. Next, description will be made regarding a mechanism for coordinate detection by means of the control circuit 100. Description will be made below regarding a mechanism for detecting the X-coordinate in the first state φx. The same can be said of detection of the Y-coordinate.

Figure 2A:
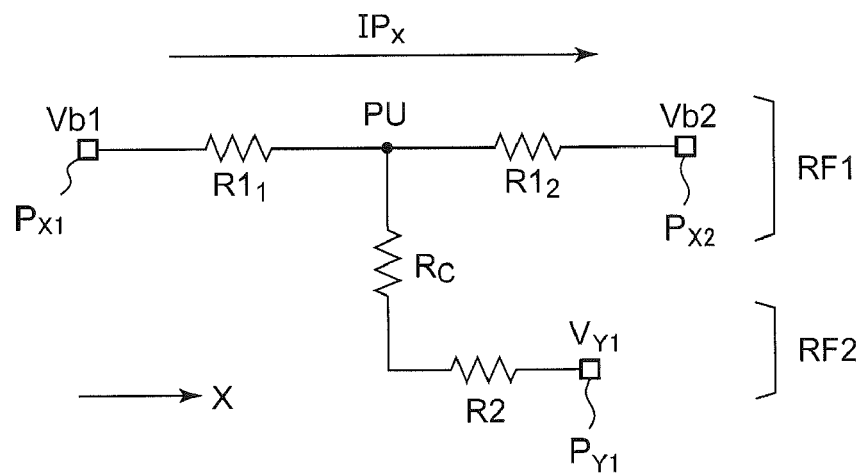
FIGS. 2A and 2B are circuit diagrams showing equivalent circuits in a single-touch state and a multi-touch state, respectively.
Figure 2B:
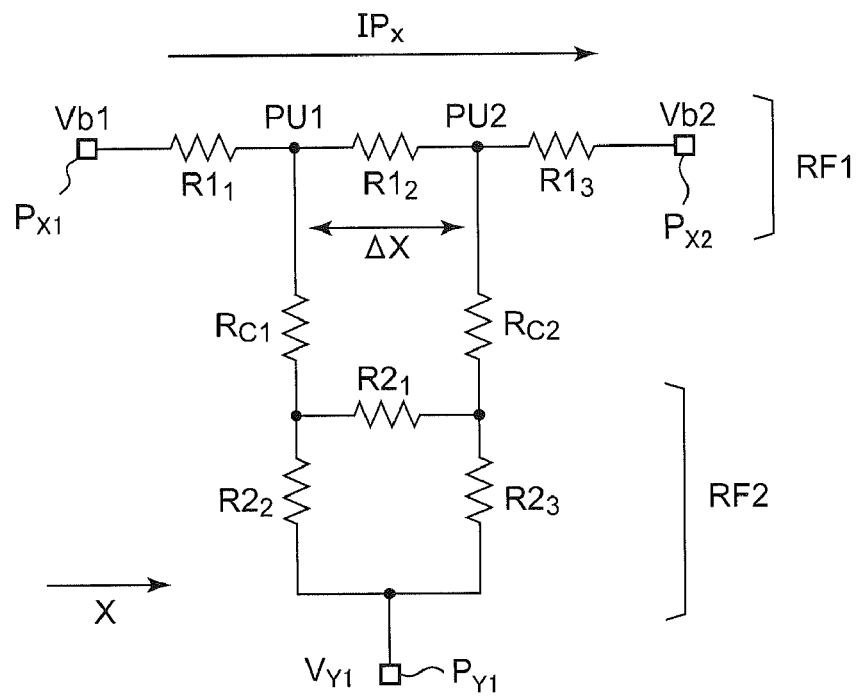

FIGS. 2A and 2B are equivalent circuit diagrams which show a circuit for the single-touch state and a circuit for the multi-touch state, respectively. It should be noted that, in actuality, each resistor shown in each drawing is the result of distributed parameters. However, discrete resistor elements are shown in the drawings for simplicity of description.

[Single-touch state] Referring to FIG. 2A, when the user touches a single point PU, the first resistive film RF1 is partitioned into a resistor $R1_1$ that corresponds to a region between the first terminal $P_{x1}$ and the point PU and a resistor $R1_2$ that corresponds to a region between the point PU and the second terminal $P_{x2}$. The first resistive film RF1 and the second resistive film RF2 are in contact at the point PU, and the contact resistance thereof is represented by Rc. The resistance of a path from the point PU of the second resistive film RF2 to the third terminal $P_{Y1}$ is represented by R2.

The electric potential at the point PU is a voltage obtained by dividing the voltage difference between the bias voltage Vb1 and the bias voltage Vb2 by the resistors $R1_1$ and $R1_2$. Accordingly, the electric potential at the point PU represents the X-coordinate of the point PU. The electric potential at the point PU is approximately the same as that at the third terminal $P_{Y1}$. That is to say, the panel voltage $V_{Y1}$ that occurs at the third terminal $P_{Y1}$ represents the X-coordinate of the point PU.

Known techniques can be employed as an algorithm used to derive the X-coordinate based upon the first panel voltage $V_{Y1}$. The algorithm used in the present invention is not restricted in particular.

For the impedance on the control circuit 100 side seen at the third terminal $P_{Y1}$ to be sufficiently high, the panel current IPx flows through a path formed of the first terminal $P_{x1}$, the resistors $R1_1$ and $R1_2$, and the second terminal $P_{X2}$. That is to say, the impedance Zs of a path between the first terminal $P_{x1}$ and the second terminal $P_{X2}$ is represented by Zs=$R1_1$+$R1_2$. The impedance Zs can be considered to be constant regardless of the position of the contact point PU. Furthermore, the impedance Zs is approximately the same as the impedance Zo when the user does not touch the panel. That is to say, the relation Zs≈Zo is satisfied.

Hereafter, the impedance in the non-contact state will not be distinguished in particular from the impedance in the single-touch state. These impedances will collectively be referred to as the "reference impedance Zo".

The panel current IPx that flows from the first terminal $P_{x1}$ to the second terminal $P_{x2}$ in either the single-touch state or in the non-contact state is represented by IPxo=(Vb1−Vb2)/Z0.

The panel current IPxo will be referred to as the "reference panel current".

[Multi-Touch State]

Referring to FIG. 2B, when the user touches two points PU1 and PU2, the first resistive film RF1 is partitioned into a resistor $R1_1$ that corresponds to a region between the first terminal $P_{x1}$ and the point PU1, a resistor $R1_2$ that corresponds to a region between the point PU1 and the point PU2, and a resistor R13 that corresponds to a region between the point PU2 and the second terminal $P_{x2}$. The first resistive film RF1 and the second resistive film RF2 are in contact at the points PU1 and PU2. The contact resistances at the points PU1 and PU2 are represented by $R_{c1}$ and $R_{c2}$.

With regard to the second resistive film RF2, the resistance that corresponds to a region between the points PU1 and PU2 is represented by R21, the resistance of a path from the point PU1 to the third terminal $P_{y1}$ is represented by $R2_2$, and the resistance of a path from the point PU2 to the third terminal $P_{y1}$ is represented by $R2_3$.

The panel current IPx in the multi-touch state is determined by the combined impedance Zm that corresponds to a path between the first terminal $P_{x1}$ and the second terminal $P_{x2}$. The relation between the combined impedance Zm and the impedance Zo in either the non-contact state or the single-touch state is represented by Zm<Zo.

Thus, the relation between the panel current IPxm in the multi-touch state and the reference panel current IPxo is represented by IPxm>IPxo.

That is to say, by monitoring the panel current IPx, and by comparing the panel current IPx thus monitored with the reference panel current IPxo, such an arrangement is capable of distinguishing between the multi-touch state and the single-touch state (and the non-contact state).

The electric potentials at the points PU1 and PU2 are each voltages obtained by dividing the voltage difference between the bias voltages Vb1 and Vb2 with the resistors $R1_1$, $R1_2$, and R13 and other resistance components. Accordingly, the electric potentials at the points PU1 and PU2 each change according to their X-coordinates. Thus, the panel voltage $V_{y1}$ that occurs at the third terminal $P_{y1}$ also changes according to the positions of the points PU1 and PU2. Accordingly, when the multi-touch state is detected, the coordinates of the points PU1 and PU2 can be estimated based upon the panel voltage $V_{y1}$.

More specifically, an X-coordinate X3 determined based upon the panel voltage $V_{y1}$ using the same algorithm as in the single-touch state represents a point positioned between the points PU1 and PU2 touched by the user. That is to say, with the X-coordinates of the points PU1 and PU2 actually touched by the user as X1 and X2, the relation X1<X3<X2 is satisfied.

That is to say, the coordinates of the points PU1 and PU2 can be estimated using the coordinate X3, the derivation of which is based upon the panel voltage $V_{y1}$. Description will be made later regarding the estimation algorithm.

As described above, with the control circuit 100 according to the embodiment, the panel current IPx is monitored in addition to the panel voltage $V_{y1}$, and processing is performed on a combination of the panel voltage $V_{y1}$ and the panel current IPx thus monitored. Thus, such an arrangement is capable of determining the coordinates of user touch points not only in the single-touch state, but also in the multi-touch state.

It is needless to say that the panel voltage $V_{y2}$ may be used instead of the panel voltage $V_{y1}$. Alternatively, the X-coordinate may be determined based upon the average of the panel voltages $V_{y1}$ and $V_{y2}$, or based upon a value obtained by performing weighted processing on the panel voltages $V_{y1}$ and $V_{y2}$.

Next, description will be made regarding a specific example configuration of the computation unit 40 and the processing operation thereof.

Returning to FIG. 1, the computation unit 40 includes a multi-touch judgment unit 42, a distance calculation unit 44, a table 46, and a coordinate generating unit 48.

Figure 3:
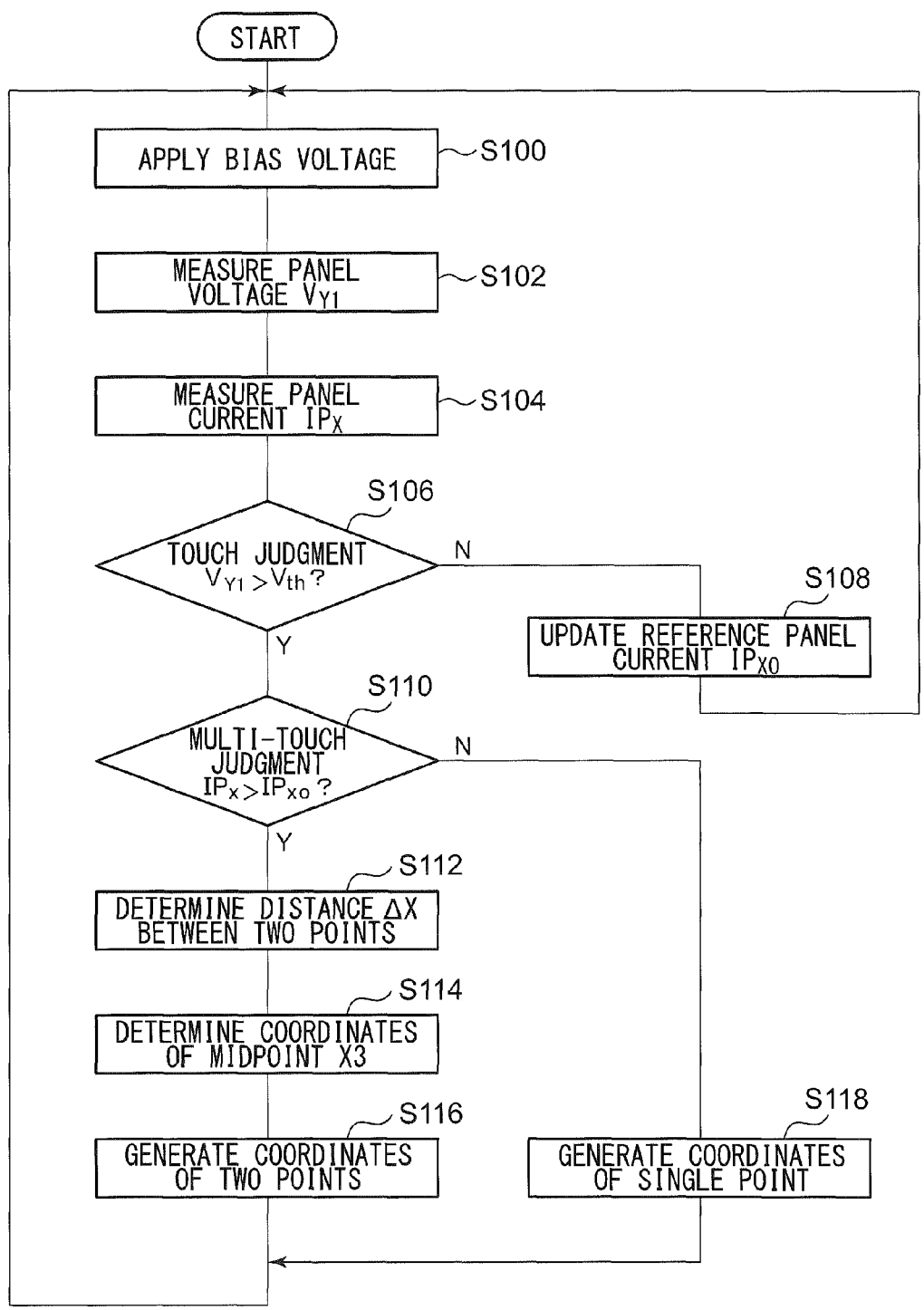
FIG. 3 is a flowchart which shows processing performed by the control circuit shown in FIG. 1.

FIG. 3 is a flowchart which shows processing performed by the control circuit 100 shown in FIG. 1. The flow shown in FIG. 3 shows the processing used to determine the X-coordinate in the first state ϕx. It should be noted that, to such an extent that the processing is not adversely affected, the sequence of the steps can be rearranged, or several steps can be simultaneously executed in a parallel manner.

First, the voltage generating unit 10 applies the bias voltages Vb1 and Vb2 to the first terminal $P_{x1}$ and the second terminal $P_{x2}$, respectively (S100). In this state, the voltage detection unit 20 measures the panel voltage $V_{y1}$ (S102), and the current detection unit 30 measures the panel current IPx (S104).

The computation unit 40 receives the digital values $V_{y1}'$ and IPx' that correspond to the panel voltage $V_{y1}$ and the panel current IPx thus obtained.

Subsequently, judgment is made whether or not the user touched the panel (S106). When the user touches a point having a low X-coordinate (in the vicinity of the edge E1), the panel voltage $V_{y1}$ is high, and when the user touches a point having a high X-coordinate (in the vicinity of the edge E2), the panel voltage $V_{y1}$ is low. In the non-contact state, no voltage is applied to the third terminal $P_{y1}$. Accordingly, in this state, the panel voltage $V_{y1}$ is approximately zero.

Thus, the coordinate generating unit 48 judges whether or not the user touched the panel, by comparing the panel voltage $V_{y1}$ with a predetermined threshold voltage Vth. The threshold voltage Vth is set to a value in the vicinity of 0 V.

When $V_{y1}$>Vth ("YES" in S106), judgment is made that the user touched the panel. Subsequently, the multi-touch judgment unit 42 judges whether or not a multi-touch operation was performed (S110). Judgment of whether or not a multi-touch operation was performed is made by comparing the panel current IPx with a predetermined reference current IPxo, as described above.

When IPx<IPxo ("NO" in S108), the multi-touch judgment unit 42 judges that a single-touch operation was performed, and notifies the coordinate generating unit 48 of this judgment result. The coordinate generating unit 48 determines the X-coordinate based upon the panel voltage $V_{y1}$ (S118).

When IPx>IPxo ("YES" in S108), the multi-touch judgment unit 42 judges that a multi-touch operation was performed, and notifies the distance calculation unit 44 and the coordinate generating unit 48 of this judgment result.

If judgment is made that a multi-touch operation was performed, the distance calculation unit 44 determines the distance ΔX between the two points PU1 and PU2 (S112).

The present inventor has come to recognize that there is a correlation between the distance ΔX between the two points PU1 and PU2 and the panel current IPx. That is to say, when the distance ΔX between the two points is zero, the state is equivalent to that of a single-touch operation, and therefore the panel current IPx is approximately the same as the reference current IPxo.

Figure 4A:
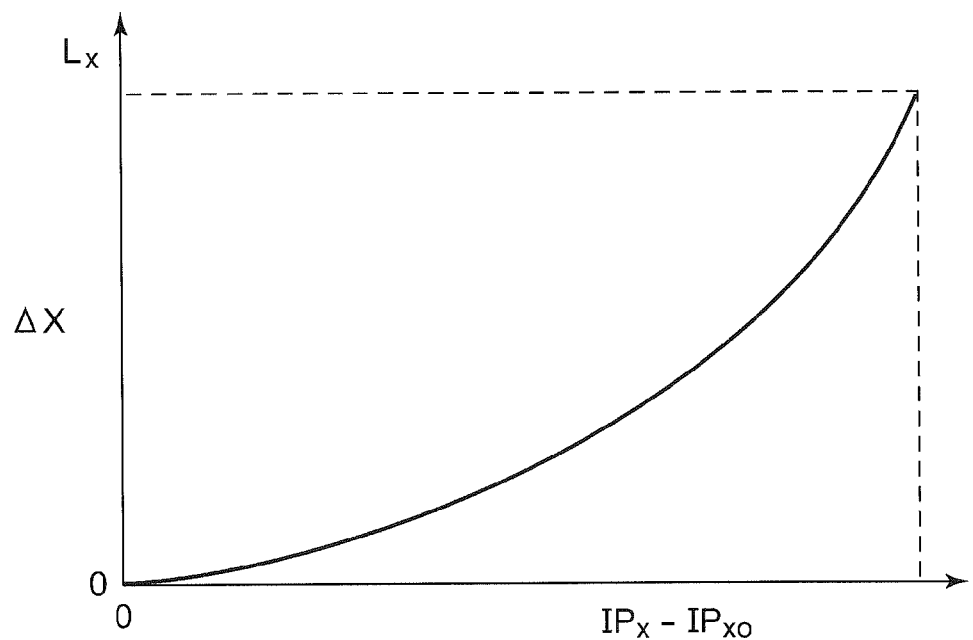
FIGS. 4A and 4B are a graph and a diagram each showing the relation between the panel current and the points in the multi-touch state.
Figure 4B:
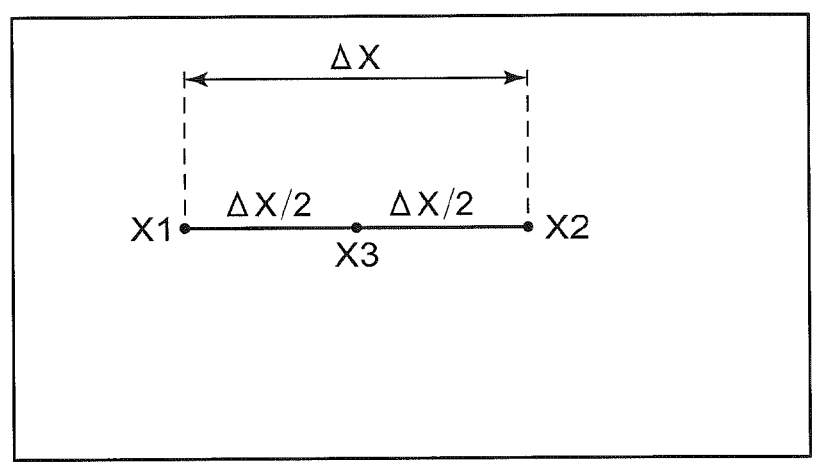

FIGS. 4A and 4B are a graph and a diagram each showing the relation between the panel current and the points in the multi-touch state.

As the distance ΔX between the two points increases, the length of the region which is equivalent to the resistors $R1_2$ and R21 connected in parallel increases. Accordingly, the combined impedance Zm of a path between the first terminal $P_{x1}$ and the second terminal $P_{x2}$ drops. Thus, the panel current IPx increases according to the drop in the combined impedance Zm. When the distance ΔX between the two points reaches the length Lx of the panel in the X-axis direction, the panel current IPx exhibits the minimum value IPxmin.

That is to say, there is a one-to-one correspondence between the panel current IPx and the distance ΔX between the two points. In other words, there is a one-to-one correspondence between the distance ΔX and the current difference (IPx−IPxo) between the panel current IPx and the reference current IPxo. FIG. 4A is a graph which shows the relation between the current difference (IPx−IPxo) and the distance ΔX.

The characteristics shown in FIG. 4A should be measured beforehand for each touch panel 4. Alternatively, the characteristics shown in FIG. 4A may be calculated by simulation. The table 46 stores the relation between the current difference (IPx−IPxo) and the distance ΔX.

The distance calculation unit 44 determines the corresponding distance ΔX, based upon the panel current IPx with reference to the table 46, and outputs the distance ΔX thus determined to the coordinate generating unit 48. It should be noted that an arrangement may be made in which an approximate analytical equation which represents the characteristics shown in FIG. 4A is stored, and the distance ΔX is obtained by calculation, instead of an arrangement employing the table 46.

The coordinate generating unit 48 receives the data which represent the distance ΔX and the panel voltage $V_{y1}$. The coordinate generating unit 48 calculates the X-coordinate X3 that corresponds to the panel voltage $V_{y1}$ using the same algorithm as that used in the single-touch state, or an algorithm that is different from that used in the single-touch state. The X-coordinate X3 thus calculated is taken as the midpoint coordinate between the two points (S114).

The coordinate generating unit 48 determines the X-coordinate x2 of one of the two points by adding a value ΔX/2, which corresponds to the interval between the two coordinates ΔX (in this example, half the distance ΔX), to the coordinate of the midpoint X3, and determines the X-coordinate x1 of the other of the two points by subtracting, from the coordinate of the midpoint X3, the value ΔX/2 which corresponds to the distance ΔX between the two coordinates (S116). FIG. 4B shows this processing. Subsequently, the flow returns to Step S100.

Referring to Step S106 again, when $V_{y1}$<Vth ("NO" in S106), the coordinate generating unit 48 judges that the panel is in the non-contact state. Subsequently, in Step S104, the multi-touch judgment unit 42 updates the reference panel current IPxo using the panel current IPx thus measured (S108). Subsequently, the flow returns to Step S100.

Furthermore, the Y-coordinate is determined in the same way as the X-coordinate.

The above is a specific flow of the processing performed by the control circuit 100.

With the input apparatus 2, the single-touch state and the multi-touch state can be appropriately distinguished. Thus, the input apparatus 2 is capable of generating point coordinates in both states. Furthermore, the input apparatus 2 according to the embodiment has the following advantages.

In Step S108, the reference panel current IPxo is updated. Thus, such an arrangement reduces the effects of time-related deterioration or fluctuations in temperature on the touch panel 4. That is to say, if the resistance values of the first resistive film RF1, the second resistive film RF2, and the contact resistance therebetween change due to deterioration or fluctuations in temperature, the reference current IPxo also changes according to the change in the resistance values. Accordingly, if a fixed value is used as the value of the reference current IPxo, such an arrangement leads to false detection of the multi-touch state. Alternatively, this leads to error in the distance ΔX between the two points. In contrast, by updating the reference current IPxo in the processing, such an arrangement is capable of appropriately solving such a problem.

Furthermore, such an arrangement in which the distance ΔX between the two points is determined using the current difference (IPx−IPxo) in the multi-touch state has the following advantage. As described above, the impedance of the panel changes due to time-related deterioration or fluctuations in temperature. In this case, even if the user touches the panel at the same coordinates, the panel current IPx changes. In order to solve such a problem, by calculating the current difference, such an arrangement reduces the effects of time-related deterioration and fluctuations in temperature. Thus, such an arrangement provides precise coordinate detection.

Figure 5:
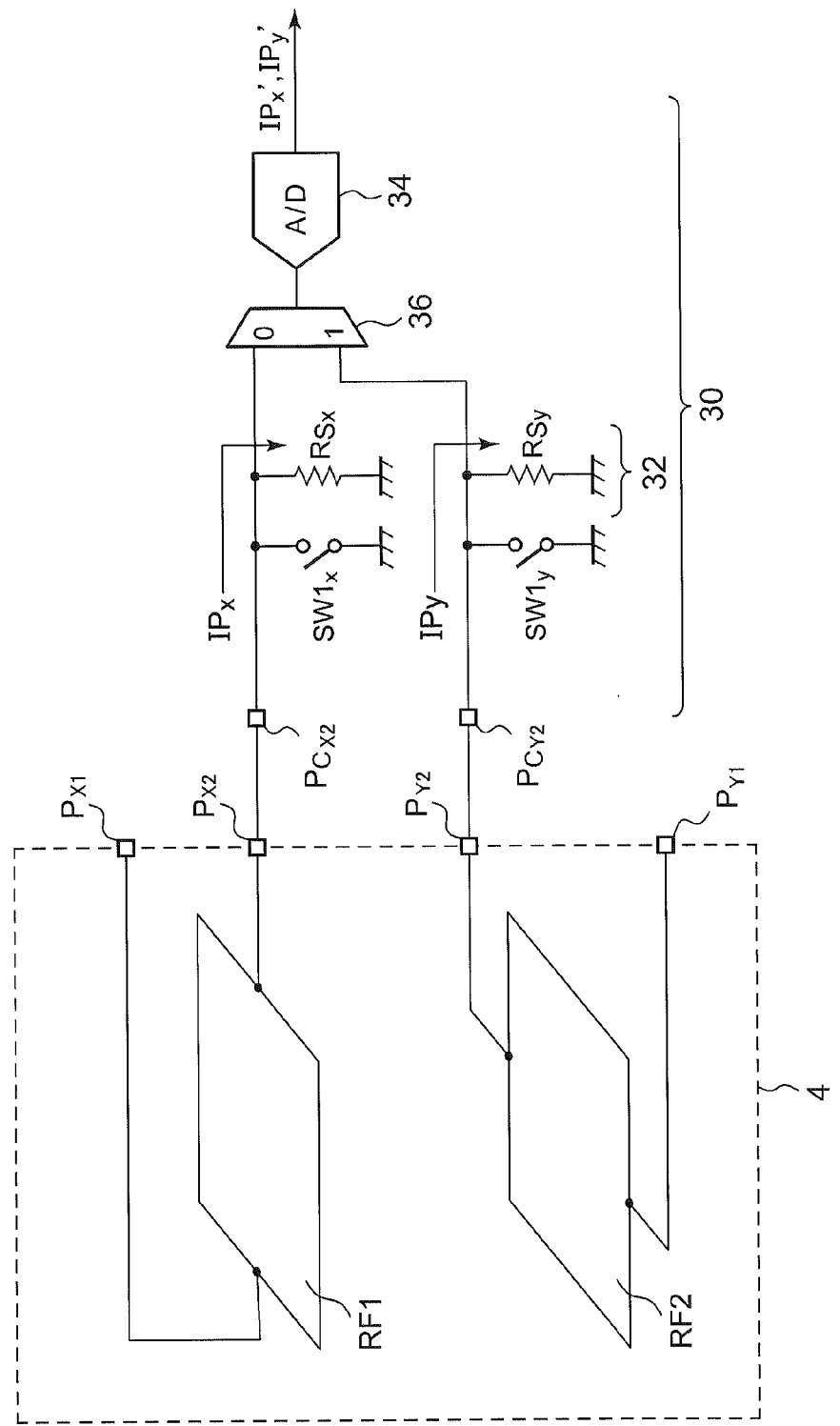
FIG. 5 is a circuit diagram which shows an example configuration of a current detection unit shown in FIG. 1.

FIG. 5 is a circuit diagram which shows an example configuration of the current detection unit 30 shown in FIG. 1. The current detection unit 30 includes detection resistors Rsx and Rsy, bypass switches SW1x and SW1y, a selector 36, and an A/D converter 34. The detection resistors Rsx and Rsy correspond to the I/V conversion unit 32 shown in FIG. 1.

The detection resistor Rsx and the bypass switch SW1x are used to detect the coordinate in the X-axis direction, and the detection resistor Rsy and the bypass switch SW1y are used to detect the coordinate in the Y-axis direction. The circuit blocks used to detect the X-axis coordinate and the Y-axis coordinate have the same configuration. Accordingly, description will be made below only regarding an arrangement used to detect the coordinate in the X-axis direction.

The detection resistor Rsx is provided as an extension to a path that includes the first terminal $P_{x1}$, the first resistive film RF1, and the second terminal $P_{x2}$. Specifically, one terminal of the detection resistor Rsx is grounded, and is set to a fixed electric potential. The other terminal thereof is connected to the second terminal $Pc_{x2}$.

The bypass switch SW1x is arranged in parallel with the corresponding detection resistor Rsx. Specifically, one terminal of the bypass switch SW1x is grounded, and the other terminal thereof is connected to the second terminal $Pc_{x2}$.

When the voltage detection unit 20 detects the panel voltage $V_{y1}$, the bypass switch SWx is turned on. In this state, the detection resistor Rsx does not affect the combined impedance of the touch panel 4. Thus, such an arrangement is capable of measuring the panel voltage $V_{y1}$ with high precision.

When the current detection unit 30 detects the panel current IPx, the bypass switch SWx is turned off. In this state, a voltage drop (Rx×IPx) which is proportional to the panel current IPx occurs at the detection resistor Rsx. When the coordinate in the X-axis direction is to be detected, the terminal (0) side of the selector 36 is on, and when the coordinate in the Y-axis direction is to be detected, the terminal (1) side of the selector 36 is on. The A/D converter 34 converts the voltage drop that occurs at the detection resistor Rsx into a digital value. The digital value thus converted represents a value that corresponds to the panel current IPx.

It should be noted that, when the ground voltage is used as the second bias voltage Vb2, such an arrangement allows the bypass switch SW1x to function as the voltage generating unit 10. That is to say, when the second bias voltage Vb2 is to be applied to the second terminal $P_{x2}$, the bypass switch SW1x should be turned on. The same can be said of the bypass switch SW1y.

Figure 6A:
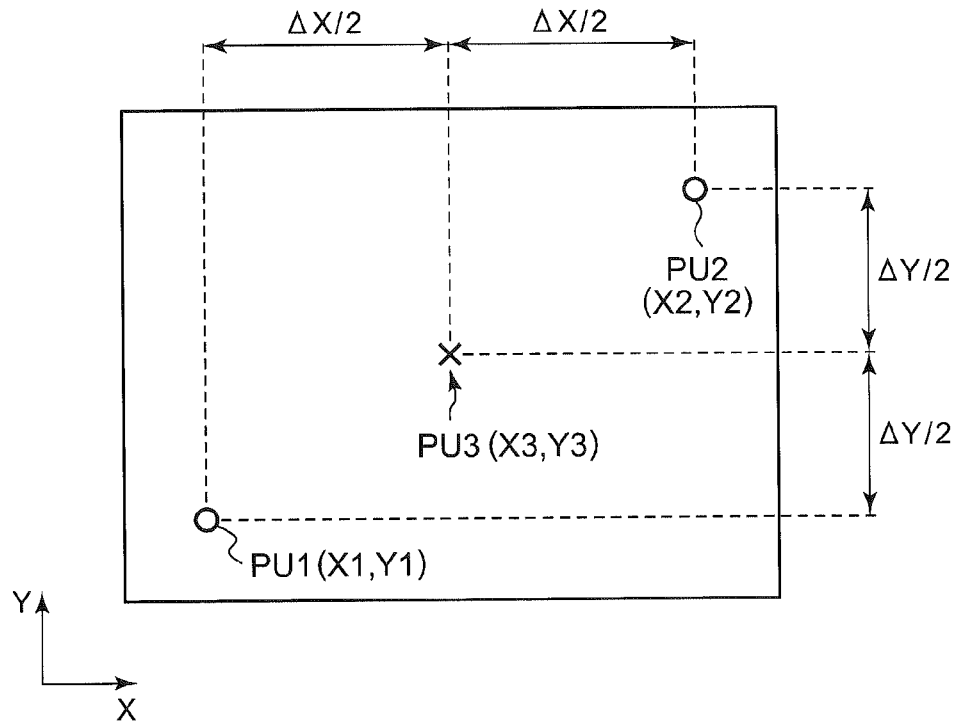
FIGS. 6A and 6B are diagrams for describing the occurrence of ghost points.
Figure 6B:
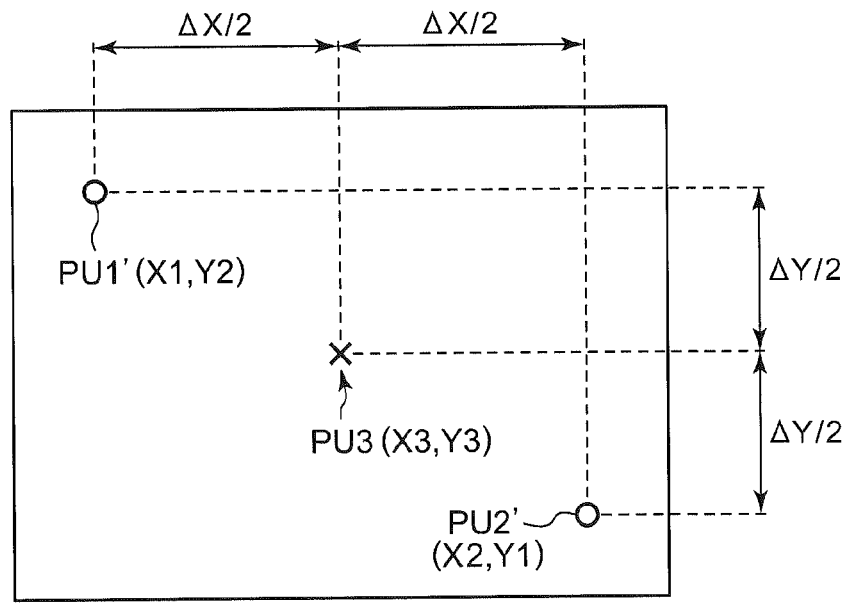

In a case in which the coordinates of the two points PU1 and PU2 in the multi-touch state are obtained using the aforementioned method or other methods, in some cases, a problem of ghost points occurs as described below. FIGS. 6A and 6B are diagrams for describing the occurrence of a ghost point. Now, let us say that the user touches the two points PU1 and PU2 shown in FIG. 6A. In this case, in the first state ϕx, the X-coordinate of the midpoint PU3 between the two points PU1 and PU2 is calculated. Subsequently, the X-coordinates X1 and X2 of the two points are calculated.

Next, in the second state ϕy, the Y-coordinate Y3 of the midpoint PU3 is calculated. Subsequently, the Y-coordinates Y1 and Y2 of the two points are calculated. In this case, by assigning Y1 to the point PU1, and by assigning Y2 to the point PU2, the correct coordinates are calculated as shown in FIG. 6A.

However, with respect to the Y-coordinates of the two points PU1 and PU2, if Y1 is assigned to the point PU2, and Y2 is assigned to the point PU1, erroneous coordinates are calculated, as shown in FIG. 6B.

This is because, with the resistive film touch panel 4, the X-coordinates of the two points and the Y-coordinates of the two points are acquired independently, and multiple combinations can be made. That is to say, with x1 and x2 as the X-coordinates of the two point thus acquired, and with y1 and y2 as the Y-coordinates of the two points thus acquired, the following four combinations can be made. For example, the combinations 1 and 4 provide the correct coordinates of the two points. However, the combinations 2 and 3 provide erroneous coordinates of the two points.

Combination 1. PU1=(x1, y1), PU2=(x2, y2)
Combination 2. PU1=(x1, y2), PU2=(x2, y1)
Combination 3. PU1=(x2, y1), PU2=(x1, y2)
Combination 4. PU1=(x2, y2), PU2=(x1, y1)

Figure 7A:
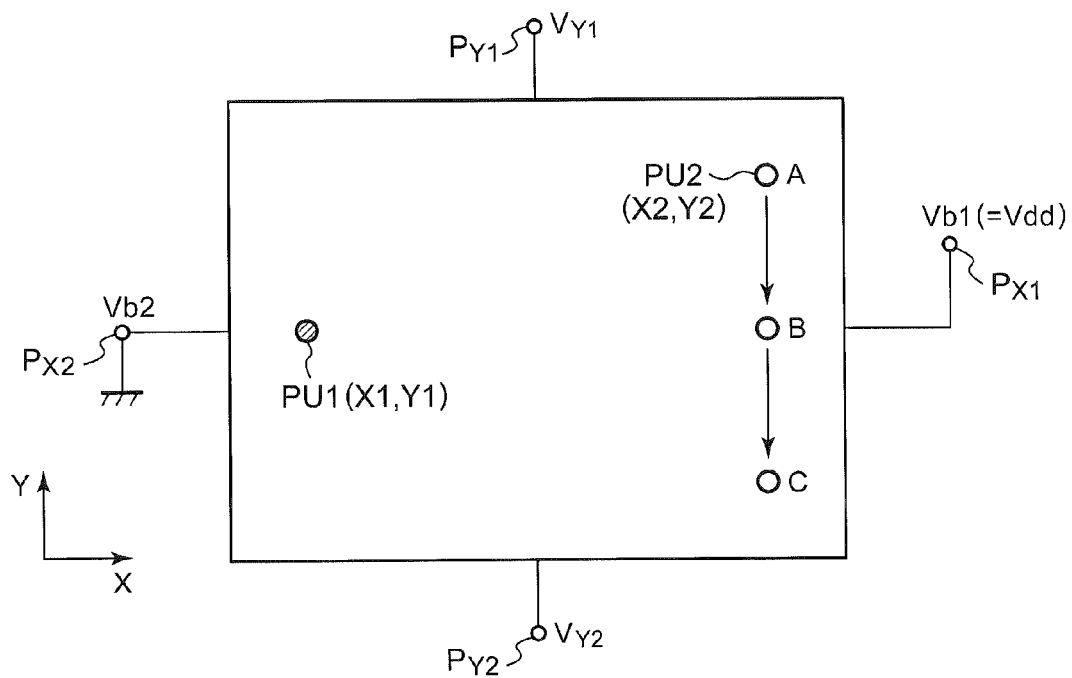
FIGS. 7A and 7B are a diagram and a graph each showing the relation between the first panel voltage $V_{Y1}$ and the second panel voltage $V_{Y2}$.
Figure 7B:
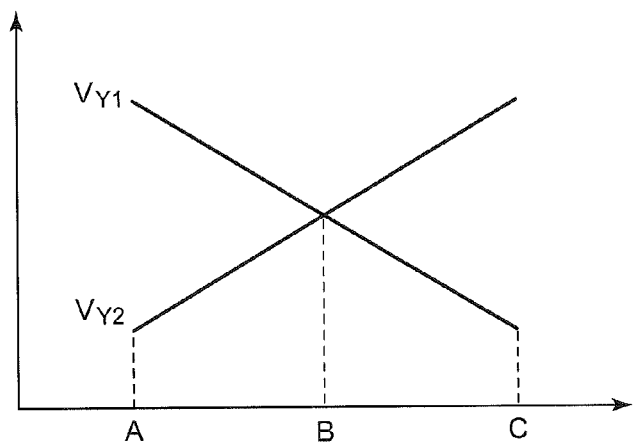

With the present embodiment, in order to solve such a problem, both the first panel voltage $V_{Y1}$ and the second panel voltage $V_{Y2}$ are used. FIGS. 7A and 7B are a diagram and a graph each showing the relation between the first panel voltage $V_{Y1}$ and the second panel voltage $V_{Y2}$. As shown in FIG. 7A, let us say that the first point PU1 is fixed, and the second point PU2 is changed to $P2_A$, $P2_B$, and $P2_C$. FIG. 7B shows the first panel voltage $V_{Y1}$ and the second panel voltage $V_{Y2}$ in this operation. As shown in FIG. 7B, when Y2>Y1, the relation $V_{Y1}>V_{Y2}$ holds true, and when Y2<Y1, $V_{Y1}<V_{Y2}$. That is to say, the magnitude relation between the Y-coordinates of the first point PU1 and the second point PU2 can be uniquely determined based upon the magnitude relation between the first panel voltage $V_{Y1}$ and the second panel voltage $V_{Y2}$. It is needless to say that, if the magnitude relation between the first bias voltage Vb1 and the second bias voltage Vb2 is the opposite, the direction of the inequality is also reversed.

Figure 8:
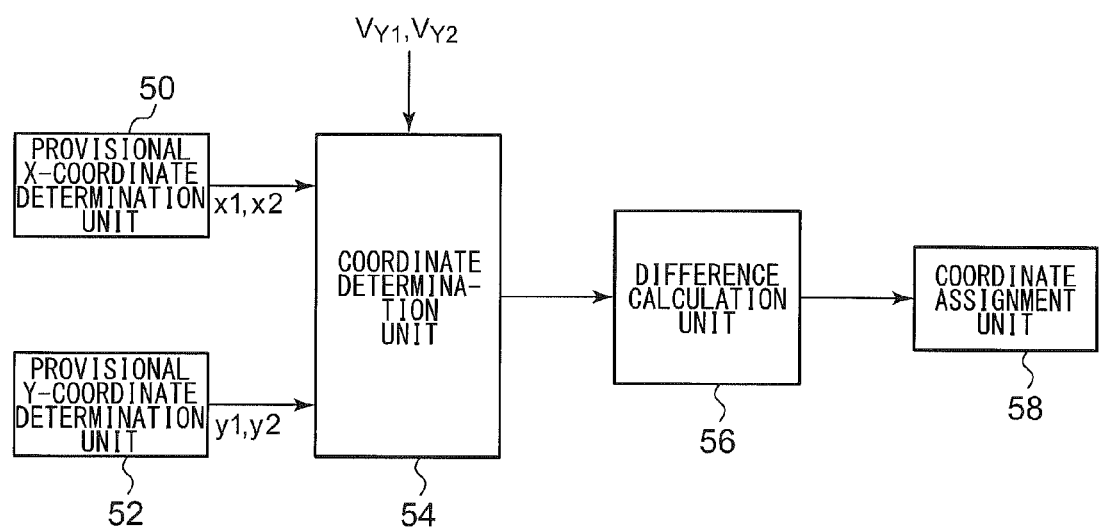
FIG. 8 is a block diagram which shows an example configuration of a coordinate generating unit according to an embodiment.
Figure 9:
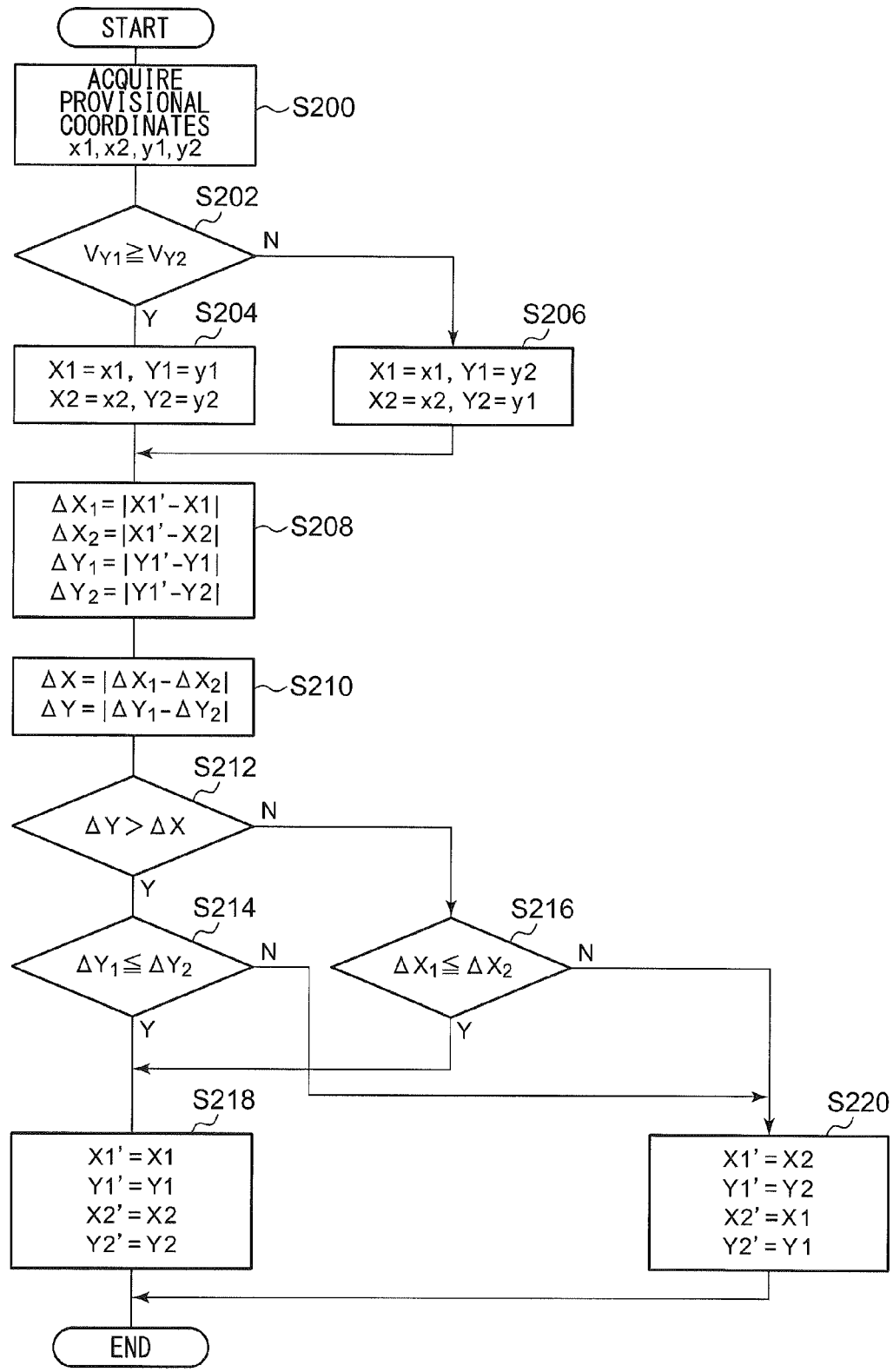
FIG. 9 is a flowchart which shows the operation of the coordinate generating unit.

FIG. 8 is a block diagram which shows an example configuration of a coordinate generating unit 48 according to the embodiment. FIG. 9 is a flowchart which shows the operation of the coordinate generating unit 48. The coordinate generating unit 48 includes a provisional X-coordinate determination unit 50, a provisional Y-coordinate determination unit 52, a coordinate determination unit 54, a difference calculation unit 56, and a coordinate assignment unit 58.

The provisional X-coordinate determination unit and the provisional Y-coordinate determination unit 52 perform provisional determination of the X-coordinate pair (x1, x2) and the Y-coordinate pair (y1, y2) of the two points touched by the user, using the aforementioned algorithm or another algorithm. In this stage, the operation is performed assuming that the relation x1<x2 and the relation y1<y2 hold true (S200 in FIG. 9).

Based upon the first panel voltage $V_{Y1}$ and the second panel voltage $V_{Y2}$, the coordinate determination unit 54 determines the coordinates of one of the two points, i.e., (X1, Y1), by combining one of (x1, x2) and one of (y1, y2), and determines the coordinates of the other of the two points, i.e., (X2, Y2), by combining the other of (x1, x2) and the other of (y1, y2) (S202 through S206 in FIG. 9).

Specifically, when $V_{Y1} \geq V_{Y2}$ (YES in S202), the coordinates of the one point, i.e., (X1, Y1), are determined to be X1=x1, and Y1=y1, and the coordinates of the other point, i.e., (X2, Y2), are determined to be X2=x2, and Y2=y2.

On the other hand, when $V_{Y1}<V_{Y2}$ (NO in S202), the coordinates of the one point, i.e., (X1, Y1), are determined to be X1=x1, and Y1=y2, and the coordinates of the other point, i.e., (X2, Y2), are determined to be X2=x2, and Y2=y1.

By means of the coordinate determination unit 54, such an arrangement is capable of eliminating the two combinations that correspond to ghost points.

In some cases, the two points thus detected in the multi-touch state must be differentiated from one another. For example, in a case in which, with drawing software, drawing is performed by moving the second point while the first point is being touched, in such an operation, exchanging the first point and the second point is not permitted. Accordingly, from among the two points thus determined in the current cycle, the coordinate generating unit 48 selects one point that is closer to the first point PU1' (X1', X2'), determined in the previous cycle, as the current first point PU1, and selects the farther point as the current second point PU2.

Such an operation prevents the first point and the second point from being exchanged in the intermediate cycles. Description will be made regarding a specific operation of the difference calculation unit 56.

The difference calculation unit 56 calculates the first through fourth difference data $\Delta Y_1$, $\Delta Y_2$, $\Delta X_1$, $\Delta X_2$ (S208 in FIG. 9).

$$\Delta Y_1 = |Y1' - Y1|$$

$$\Delta Y_2 = |Y1' - Y2|$$

$$\Delta X_1 = |X1' - X1|$$

$$\Delta X_2 = |X1' - X2|$$

Y1' represents the coordinate of the first direction (Y-axis direction) of the first point PU1' determined in the previous cycle. The difference calculation unit 56 calculates the following fifth and sixth difference data ΔY and ΔX (S210 in FIG. 9).

$$\Delta Y = |\Delta Y_1 - \Delta Y_2|$$

$$\Delta X = |\Delta X_1 - \Delta X_2|$$

When the fifth difference data ΔY is greater than the sixth difference data ΔX (YES in S212 in FIG. 9), the coordinate assignment unit 58 assigns the two points to the first point and the second point based upon the magnitude relation between the first and second difference data $\Delta Y_1$ and $\Delta Y_2$ (S214). Specifically, when $\Delta Y_1 \leq \Delta Y_2$ (YES in S214), the coordinate assignment unit 58 outputs the current first and second points without change (S218). When $\Delta Y_1 > \Delta Y_2$ (NO in S214), the current first and second points are exchanged (S220).

Conversely, when the sixth difference data ΔX is greater than the fifth difference data ΔY (NO in S212), the coordinate assignment unit 58 assigns the two points to the first point and the second point based upon the magnitude relation between the third and fourth difference data $\Delta X_1$ and $\Delta X_2$ (S216). Specifically, when $\Delta X_1 \leq \Delta X_2$ (YES in S216), the coordinate assignment unit 58 outputs the current first and second points without change (S218). When $\Delta X_1 > \Delta X_2$ (NO in S216), the current first and second points are exchanged (S220).

By means of such an operation, such an arrangement is capable of preventing the first point and the second point from being exchanged in the intermediate cycles. Furthermore, by using the greater of ΔY and ΔX, such an arrangement provides such an operation with improved precision.

It should be noted that, in such an operation for exchanging the first point and the second point, only $\Delta X_1$ and $\Delta X_2$ may be used. Alternatively, only $\Delta Y_1$ and $\Delta Y_2$ may be used. Also, an arrangement may be made in which the distances $\Delta L_1$ and $\Delta L_2$ (or the squares thereof) are calculated, and the first and second points are exchanged based upon the calculation result.

$$\Delta L_1 = \sqrt{(|Y1'-Y1|^2 + |X1'-X1|^2)}$$

$$\Delta L_2 = \sqrt{(|Y1'-Y2|^2 + |X1'-X2|^2)}$$

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the coordinates of the two points PU1 and PU2 are determined based upon the first panel voltage $V_{Y1}$ and the second panel voltage $V_{Y2}$. Also, an arrangement may be made in which the coordinates of the two points PU1 and PU2 are determined based upon the third panel voltage $V_{X1}$ and the fourth panel voltage $V_{X2}$. In this case, the aforementioned steps S202 and S206 shown in FIG. 9 should be modified, as in the Steps S202' and S206' below.

In S202', judgment is made whether or not $V_{X1} \geq V_{X2}$.

In S206', X1 is set to x2, Y1 is set to y1, X2 is set to x1, and Y2 is set to y2.

Description has been made regarding an arrangement in which, in the multi-touch state, the coordinate generating unit 48 determines the coordinates X1 and X2 to be detected, assuming that the coordinate X3 that corresponds to the panel voltage $V_{X1}$ matches the midpoint between the two points PU1 and PU2. However, the present invention is not restricted to such an arrangement. Also, such an arrangement may employ a more complicated algorithm.

Description has been made in the embodiment regarding an arrangement configured to control the four-line touch panel 4. However, the present invention is not restricted to such an arrangement. Also, the present invention may be applied to the touch panel 4 having other configurations.

Description has been made in the embodiment regarding an arrangement in which the coordinates of two points are detected in the multi-touch state for exemplary purposes. However, such a multi-touch detection operation may be extended to detection of three or more points in the multi-touch state, which can be readily conceived by those skilled in this art, and which is encompassed in the technical scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A control method, for a touch panel comprising a first terminal, a second terminal, a third terminal, a fourth terminal, a first resistive film arranged such that one edge thereof that extends in a first direction is connected to the first terminal and an edge that is opposite to the aforementioned one edge is connected to the second terminal, and a second resistive film arranged with a gap between it and the first resistive film such that one edge thereof that extends in a second direction orthogonal to the aforementioned first direction is connected to the third terminal, and an edge that is opposite to the aforementioned one edge is connected to the fourth terminal, the control method comprising:

applying a predetermined first bias voltage and a predetermined second bias voltage to the first terminal and the second terminal, respectively;

detecting a first panel voltage and a second panel voltage that occur at the third and fourth terminals, respectively;

detecting a first panel current that flows through a path that comprises the first terminal, the first resistive film, and the second terminal;

provisionally determining of the second-direction coordinate of a point touched by the user based upon the first panel current and at least one of the first and second panel voltages;

applying predetermined third and fourth bias voltages to the third and fourth terminals, respectively;

detecting a third panel voltage that occurs at one of the first and second terminals;

detecting a second panel current that flows through a path that comprises the third terminal, the second resistive film, and the fourth terminal;

provisionally determining the first-direction coordinate of the point touched by the user, based upon at least the third panel voltage and the second panel current; and determining the coordinates of two points by combining the second-direction coordinates of the two points thus provisionally determined and the first-direction coordinates of the two points thus provisionally determined, based upon the magnitude relation between the first panel voltage and the second panel voltage, when the user touches the two points at the same time.

2. A control method according to claim 1, wherein, the two points are to be differentiated as a first point and a second point, in the aforementioned operation for determining the coordinates of the two points, from among the aforementioned points determined in the current stage, one point that is closer to the first point determined in a previous stage is selected as the current first point, and the farther point is selected as the current second point.

3. A control method according to claim 2, wherein the operation for determining the coordinates of the two points comprises:

calculating first difference data that corresponds to the difference between the first-direction coordinate of the first point determined in the previous stage and the first-direction coordinate of one of the two points detected in the current stage;

calculating second difference data that corresponds to the difference between the first-direction coordinate of the first point determined in the previous stage and the first-direction coordinate of the other of the two points detected in the current stage; and respectively assigning the aforementioned two points to the first point and the second point based upon the magnitude relation between the first difference data and the second difference data.

4. A control method according to claim 2, wherein the operation for determining the coordinates of the two points comprises:

calculating third difference data that corresponds to the difference between the second-direction coordinate of the first point determined in the previous stage and the second-direction coordinate of one of the two points detected in the current stage;

calculating fourth difference data that corresponds to the difference between the second-direction coordinate of the first point determined in the previous stage and the second-direction coordinate of the other of the two points detected in the current stage; and respectively assigning the aforementioned two points to the first point and the second point based upon the magnitude relation between the third difference data and the fourth difference data.

5. A control method according to claim 2, wherein the operation for determining the coordinates of the two points comprises:

calculating first difference data that corresponds to the difference between the first-direction coordinate of the first point determined in the previous stage and the first-direction coordinate of one of the two points detected in the current stage;

calculating second difference data that corresponds to the difference between the first-direction coordinate of the first point determined in the previous stage and the first-direction coordinate of the other of the two points detected in the current stage;

calculating third difference data that corresponds to the difference between the second-direction coordinate of the first point determined in the previous stage and the second-direction coordinate of one of the two points detected in the current stage;

calculating fourth difference data that corresponds to the difference between the second-direction coordinate of the first point determined in the previous stage and the second-direction coordinate of the other of the two points detected in the current stage;

calculating fifth difference data that corresponds to the difference between the first difference data and the second difference data;

calculating sixth difference data that corresponds to the difference between the third difference data and the fourth difference data; and performing an assignment operation such that, when the fifth difference data is greater than the sixth difference data, the aforementioned two points are assigned to the first point and the second point based upon the magnitude relation between the first and second difference data, and when the sixth difference data is greater than the fifth difference data, the aforementioned two points are assigned to the first point and the second point based upon the magnitude relation between the third and fourth difference data.

6. A control method according to claim 1, wherein the operation for provisionally determining the second-direction coordinate comprises judgment that the user has touched multiple points when the first panel current is greater than a predetermined value, and wherein the operation for provisionally determining the first-direction coordinate comprises judgment that the user has touched multiple points when the second panel current is greater than a predetermined value.

7. A control method according to claim 1, wherein the operation for provisionally determining the second-direction coordinate comprises:

determining the interval between the second-direction coordinates of the aforementioned two points based upon the first panel current;

determining the second-direction coordinate of the midpoint between the aforementioned two points based upon at least one of the first and second panel voltages;

determining the second-direction coordinate of one of the aforementioned two points by summing the coordinate of the midpoint and a value that corresponds to the interval between the coordinates of the two points, and determining the second-direction coordinate of the other of the two points by subtracting a value that corresponds to the interval between the coordinates of the two points from the coordinate of the midpoint, and wherein the operation for provisionally determining the first-direction coordinate comprises:

determining the interval between the first-direction coordinates of the aforementioned two points based upon the second panel current;

determining the first-direction coordinate of the midpoint between the aforementioned two points based upon at least the third panel voltage; and determining the first-direction coordinate of one of the aforementioned two points by summing the coordinate of the midpoint and a value that corresponds to the interval between the coordinates of the two points, and determining the first-direction coordinate of the other of the two points by subtracting a value that corresponds to the interval between the coordinates of the two points from the coordinate of the midpoint.

8. A control circuit configured to control a touch panel that comprises a first terminal, a second terminal, a third terminal, a fourth terminal, a first resistive film arranged such that one edge thereof that extends in a first direction is connected to the first terminal and an edge that is opposite to the aforementioned one edge is connected to the second terminal, and a second resistive film arranged with a gap between it and the first resistive film such that one edge thereof that extends in a second direction orthogonal to the aforementioned first direction is connected to the third terminal, and an edge that is opposite to the aforementioned one edge is connected to the fourth terminal, the control circuit comprising:

a voltage generating unit configured to respectively apply a predetermined first bias voltage and a predetermined second bias voltage to the first terminal and the second terminal in a first state, and to respectively apply a predetermined third bias voltage and a predetermined fourth bias voltage to the third terminal and the fourth terminal in a second state;

a voltage detection unit configured to detect a first panel voltage and a second panel voltage that respectively occur at the third and fourth terminals in the first state, and to detect a third panel voltage that occurs at one of the third and fourth terminals in the second state;

a current detection unit configured to detect a first panel current that flows through a path that comprises the first terminal, the first resistive film, and the second terminal in the first state, and to detect a second panel current that flows through a path that comprises the third terminal, the second resistive film, and the fourth terminal in the second state; and a coordinate generating unit configured to provisionally determine the second-direction coordinate of a point touched by the user based upon the first panel current and at least one of the first and second panel voltages in the first state, to provisionally determine the first-direction coordinate of the point touched by the user based upon at least the third panel voltage and the second panel current in the second state, and to determine the coordinates of two points by combining the second-direction coordinates of the two points thus provisionally determined and the first-direction coordinates of the two points thus provisionally determined, based upon the magnitude relation between the first panel voltage and the second panel voltage, when the user touches the two points, i.e., a first point and a second point at the same time.

9. A control circuit according to claim 8, wherein the coordinate generating unit is configured such that, when the two points are to be differentiated as the first point and the second point, from among the aforementioned two points determined in the current stage, the coordinate generating unit selects one point that is closer to the first point determined in a previous stage as the current first point, and selects the farther point as the current second point.

10. A control circuit according to claim 9, wherein the coordinate generating unit comprises:

a difference calculation unit configured to calculate first difference data that corresponds to the difference between the first-direction coordinate of the first point determined in the previous stage and the first-direction coordinate of one of the two points detected in the current stage, and to calculate second difference data that corresponds to the difference between the first-direction coordinate of the first point determined in the previous stage and the first-direction coordinate of the other of the two points detected in the current stage; and a coordinate assignment unit configured to respectively assign the aforementioned two points to the first point and the second point based upon the magnitude relation between the first difference data and the second difference data.

11. A control circuit according to claim 9, wherein the coordinate generating unit comprises:

a difference calculation unit configured to calculate third difference data that corresponds to the difference between the second-direction coordinate of the first point determined in the previous stage and the second-direction coordinate of one of the two points detected in the current stage, and to calculate fourth difference data that corresponds to the difference between the second-direction coordinate of the first point determined in the previous stage and the second-direction coordinate of the other of the two points detected in the current stage; and a coordinate assignment unit configured to respectively assign the aforementioned two points to the first point and the second point based upon the magnitude relation between the third difference data and the fourth difference data.

12. A control circuit according to claim 9, wherein the coordinate generating unit comprises:

a difference calculation unit configured to calculate first difference data that corresponds to the difference between the first-direction coordinate of the first point determined in the previous stage and the first-direction coordinate of one of the two points detected in the current stage, to calculate second difference data that corresponds to the difference between the first-direction coordinate of the first point determined in the previous stage and the first-direction coordinate of the other of the two points detected in the current stage, to calculate third difference data that corresponds to the difference between the second-direction coordinate of the first point determined in the previous stage and the second-direction coordinate of one of the two points detected in the current stage, and to calculate fourth difference data that corresponds to the difference between the second-direction coordinate of the first point determined in the previous stage and the second-direction coordinate of the other of the two points detected in the current stage; and a coordinate assignment unit configured such that, when the fifth difference data is greater than the sixth difference data, the coordinate assignment unit respectively assigns the aforementioned two points to the first point and the second point based upon the magnitude relation between the first difference data and the second difference data, and when the sixth difference data is greater than the fifth difference data, the coordinate assignment unit respectively assigns the aforementioned two points to the first point and the second point based upon the magnitude relation between the third difference data and the fourth difference data.

13. A touch panel input apparatus comprising:

a touch panel that comprises a first terminal, a second terminal, a third terminal, a fourth terminal, a first resistive film arranged such that one edge thereof that extends in a first direction is connected to the first terminal and an edge that is opposite to the aforementioned one edge is connected to the second terminal, and a second resistive film arranged with a gap between it and the first resistive film such that one edge thereof that extends in a second direction orthogonal to the aforementioned first direction is connected to the third terminal, and an edge that is opposite to the aforementioned one edge is connected to the fourth terminal; and a control circuit configured to control the touch panel, wherein the control circuit comprises:

a voltage generating unit configured to respectively apply a predetermined first bias voltage and a predetermined second bias voltage to the first terminal and the second terminal in a first state, and to respectively apply a predetermined third bias voltage and a predetermined fourth bias voltage to the third terminal and the fourth terminal in a second state;

a voltage detection unit configured to detect a first panel voltage and a second panel voltage that respectively occur at the third and fourth terminals in the first state, and to detect a third panel voltage that occurs at one of the third and fourth terminals in the second state;

a current detection unit configured to detect a first panel current that flows through a path that comprises the first terminal, the first resistive film, and the second terminal in the first state, and to detect a second panel current that flows through a path that comprises the third terminal, the second resistive film, and the fourth terminal in the second state; and a coordinate generating unit configured to provisionally determine the second-direction coordinate of a point touched by the user based upon the first panel current and at least one of the first and second panel voltages in the first state, to provisionally determine the first-direction coordinate of the point touched by the user based upon at least the third panel voltage and the second panel current in the second state, and to determine the coordinates of two points by combining the second-direction coordinates of the two points thus provisionally determined and the first-direction coordinates of the two points thus provisionally determined, based upon the magnitude relation between the first panel voltage and the second panel voltage, when the user touches the two points, i.e., a first point and a second point at the same time.

14. An electronic device comprising a touch panel input apparatus, wherein the touch panel input apparatus comprises:

a touch panel that comprises a first terminal, a second terminal, a third terminal, a fourth terminal, a first resistive film arranged such that one edge thereof that extends in a first direction is connected to the first terminal and an edge that is opposite to the aforementioned one edge is connected to the second terminal, and a second resistive film arranged with a gap between it and the first resistive film such that one edge thereof that extends in a second direction orthogonal to the aforementioned first direction is connected to the third terminal, and an edge that is opposite to the aforementioned one edge is connected to the fourth terminal; and a control circuit configured to control the touch panel, wherein the control circuit comprises:

a voltage generating unit configured to respectively apply a predetermined first bias voltage and a predetermined second bias voltage to the first terminal and the second terminal in a first state, and to respectively apply a predetermined third bias voltage and a predetermined fourth bias voltage to the third terminal and the fourth terminal in a second state;

a voltage detection unit configured to detect a first panel voltage and a second panel voltage that respectively occur at the third and fourth terminals in the first state, and to detect a third panel voltage that occurs at one of the third and fourth terminals in the second state;

a current detection unit configured to detect a first panel current that flows through a path that comprises the first terminal, the first resistive film, and the second terminal in the first state, and to detect a second panel current that flows through a path that comprises the third terminal, the second resistive film, and the fourth terminal in the second state; and a coordinate generating unit configured to provisionally determine the second-direction coordinate of a point touched by the user based upon the first panel current and at least one of the first and second panel voltages in the first state, to provisionally determine the first-direction coordinate of the point touched by the user based upon at least the third panel voltage and the second panel current in the second state, and to determine the coordinates of two points by combining the second-direction coordinates of the two points thus provisionally determined and the first-direction coordinates of the two points thus provisionally determined, based upon the magnitude relation between the first panel voltage and the second panel voltage, when the user touches the two points, i.e., a first point and a second point at the same time.

* * * * *